(12) United States Patent
Liu et al.

(10) Patent No.: US 8,804,470 B1
(45) Date of Patent: *Aug. 12, 2014

(54) DETECTOR FOR HIGH FREQUENCY AMPLITUDE MODULATION DISTORTION

(71) Applicant: Marvell International Ltd., Hamilton (BM)

(72) Inventors: Jingfeng Liu, Longmont, CO (US); Hoatian Zhang, Longmont, CO (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/052,535

(22) Filed: Oct. 11, 2013

Related U.S. Application Data

(63) Continuation of application No. 12/185,643, filed on Aug. 4, 2008, now Pat. No. 8,559,283.

(60) Provisional application No. 60/957,302, filed on Aug. 22, 2007.

(51) Int. Cl.
*G11B 7/00* (2006.01)

(52) U.S. Cl.
USPC .................................................. 369/44.35

(58) Field of Classification Search
None
See application file for complete search history.

(56) References Cited

U.S. PATENT DOCUMENTS

| | | |
|---|---|---|
| 6,791,919 B2 | 9/2004 | Shim et al. |
| 7,580,334 B2 | 8/2009 | Kadowaki et al. |
| 8,111,739 B1 | 2/2012 | Liu et al. |

*Primary Examiner* — Joseph Feild
*Assistant Examiner* — Parul Gupta

(57) ABSTRACT

A method in a signal processor includes equalizing, with an equalizer of the signal processor, a signal corresponding to data read from a storage medium to generate an equalized signal, determining a signal level of the equalized signal, determining an expected signal level of the equalized signal, performing a comparison between the signal level of the equalized signal and the expected signal level, adjusting, after the equalized signal is output from the equalizer, an amplitude of the equalized signal by an amount determined based on the comparison of the signal level of the equalized signal and the expected signal level, and decoding the equalized signal after adjusting the amplitude of the equalized signal.

21 Claims, 15 Drawing Sheets

DETECTOR FOR HIGH FREQUENCY AMPLITUDE MODULATION DISTORTION

CROSS-REFERENCE TO RELATED APPLICATION

This application is a continuation of U.S. patent application Ser. No. 12/185,643 (now U.S. Pat. No. 8,559,283), entitled "Detector for High Frequency Amplitude Modulation Distortion" and filed on Aug. 4, 2008, which claims the benefit of U.S. Provisional Application No. 60/957,302, entitled "Detector for High Frequency Amplitude Modulation Distortion" and filed on Aug. 22, 2007. The entire disclosures of both of the applications identified above are hereby incorporated by reference herein.

DESCRIPTION OF RELATED ART

Optical media, such as compact disk (CD), digital versatile disk (DVD), high definition DVD (HD DVD), Blu-Ray, etc. rely on light passing through an optically transparent substrate. When the substrate is dirty or damaged, or if a top layer of a two layer disk creates cross-talk interference for the lower layer, the output signal may experience distortion.

FIG. 1 illustrates an output signal 102 with distortion caused by a fingerprint, a particularly common problem in optical media. The distortion area 104 is characterized by low signal level and ridges 106 corresponding to the fingerprint ridges.

The signal level difference 108 between the normal output and the distorted output is the result of an automatic gain control (AGC) circuit not being able to adjust the signal level over that range. Normally, the AGC circuit adjusts for minor variations in signal level. A very high bandwidth AGC can correct for such a significant signal level difference 108, however, high bandwidth AGCs can increase noise and make the AGC loop unstable which is not desirable.

SUMMARY OF THE DISCLOSURE

In one embodiment, a signal processor uses two signal paths that allow an estimate of the signal difference 108 of FIG. 1 and then multiplies the signal by a proportional amount. This may allow a relatively narrow bandwidth AGC to handle minor signal level variations and a "boost" unit to compensate the output signal when a major signal level distortion event is encountered. A typical AGC circuit selectively increases gain of an amplifier stage to increase or decrease signal level using a reference level as the target value. In contrast, the boost circuit estimates a level of distortion by comparing an actual signal level and an expected nominal signal level and selectively multiplies the signal by a proportional amount. The technique used in the boost unit is appropriate for short-lived, e.g. high frequency, distortion where a moving average, for example, may be used to estimate the expected signal level.

A main signal path may include an equalizer while an alternate signal path may include an estimator with an integrating feedback component having a slower response than the equalizer. When no distortion exists, the two paths have nearly equal outputs and the output of the boost unit essentially has no effect on the main signal. When a significant level of distortion is observed, however, the outputs of the two paths diverge and an estimated difference may be utilized to compensate for the distortion. Delay units may be utilized to facilitate applying the compensating signal at the occurrence of the distortion.

In this manner, signal distortion due to dirt, fingerprints, multilayer crosstalk, etc. may be compensated for without introducing the noise inherently caused by a high bandwidth AGC. Additionally, the compensation technique may provide improved output distortion characteristics when the AGC is saturated (i.e. has reached its limit of adjustment).

For both normal operation and saturated AGC situations, improvements in the range of an order of magnitude can be observed in output signal distortion over detectors without the boost unit.

While the technique described is well suited to optical media where dirt, fingerprints, and multilayer crosstalk are common, its use is well suited to any application where small and large distortions of signal level are likely to occur. In these cases, a narrow bandwidth AGC can be used to manage small signal level changes while the boost unit may be used to handle large, relatively brief signal level changes.

In one embodiment, a method includes in a signal processor includes equalizing, with an equalizer of the signal processor, a signal corresponding to data read from a storage medium to generate an equalized signal, determining, in the signal processor, a signal level of the equalized signal, determining, in the signal processor, an expected signal level of the equalized signal, performing, in the signal processor, a comparison between the signal level of the equalized signal and the expected signal level, adjusting, in the signal processor and after the equalized signal is output from the equalizer, an amplitude of the equalized signal by an amount determined based on the comparison of the signal level of the equalized signal and the expected signal level, and decoding, in the signal processor, the equalized signal after adjusting the amplitude of the equalized signal.

In another embodiment, an apparatus includes an equalizer configured to generate an equalized signal by equalizing a signal corresponding to data read from a storage medium, a signal estimator configured to generate an estimated signal corresponding to the equalized signal, a first signal level detector configured to detect a level of the equalized signal, a second signal level detector configured to detect a level of the estimated signal, a gain error detector configured to generate a comparison of the level of the equalized signal and the level of the estimated signal, a multiplier, separate from the equalizer, configured to amplify the equalized signal by an amount determined based on the comparison, and a decoder configured to decode the equalized signal after amplification by the multiplier. The equalizer, the signal estimator, the first signal level detector, the second signal level detector, the gain error detector, the multiplier, and the decoder are implemented using one or more integrated circuit devices.

In yet another embodiment, an apparatus includes means for equalizing a signal corresponding to data read from a storage medium to generate an equalized signal, means for generating an estimated signal corresponding to the equalized signal, means for detecting a level of the equalized signal, means for detecting a level of the estimated signal, means for generating a comparison of the level of the equalized signal and the level of the estimated signal, means, separate from the means for equalizing the signal, for amplifying the equalized signal by an amount determined based on the comparison, and means for decoding the equalized signal after amplification by the means for amplifying.

DETAILED DESCRIPTION

Figure 2:
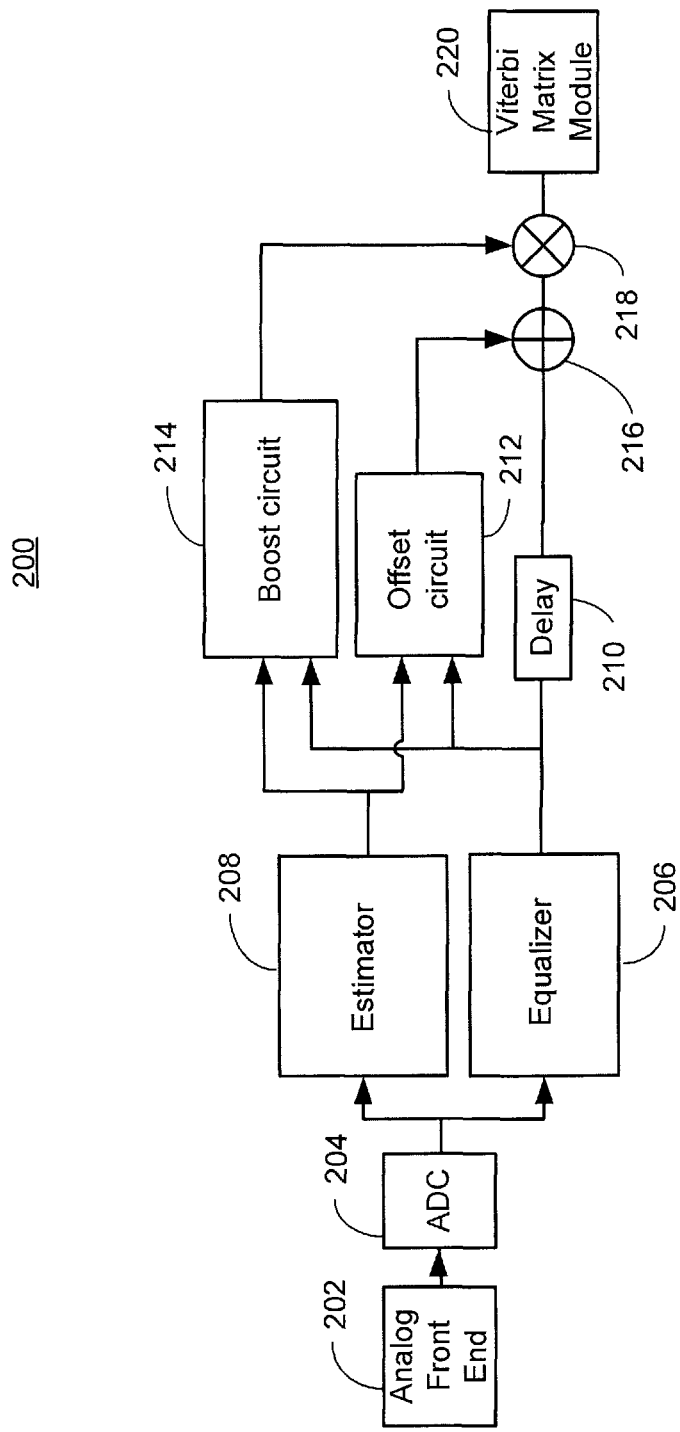
FIG. 2 is a block diagram of a signal processor.

FIG. 2 is a block diagram of an example signal processor 200 that includes components for correcting for distortions in a signal. The signal processor 200 may include an analog front end 202 and an analog to digital converter (ADC) 204. The analog front end 202 may comprise, or be coupled to, an optical storage medium reading device, and may generate an analog signal corresponding to data read from an optical storage medium. The ADC 204 samples the analog signal generated by the front end 202 to generate a digital signal corresponding to the analog signal generated by the front end 202. The output of the ADC 204 may be coupled to two different components, an equalizer 206 and an estimator 208. An output of the equalizer 206 may be coupled to a delay unit 210, an offset unit 212, and a boost unit 214. An output of the estimator 208 may be coupled to the offset unit 212 and the boost unit 214.

A primary signal path continues from the equalizer 206 to the delay circuit 210 to an adder 216, a multiplier 218, and a Viterbi matrix module 220.

The equalizer 206 and the estimator 208 both process the output of the ADC 204. The equalizer 206 generates a primary signal that is, ultimately, processed and decoded, while the estimator 208 utilizes a fast decoder and an averaging (integrating) unit to generate a slower moving output that can be interpreted as an average or expected signal level of the primary signal.

The equalizer 206 may be configured, for example, to boost high frequency components to compensate for an optical frequency response of a source device, e.g., an optical disk reader. Based on the disclosure and teachings provided herein, many methods of digital filtering are known that may be suitable for this purpose. For example, the equalizer 206 may be a finite impulse response (FIR) filter, which can be expressed by the following equation:

$$b(k) = \sum_{i=0}^{N} F_i a(k-i)$$

where a(k) is the input signal, b(k) is the output signal, $F_i$ is the $i^{th}$ filter coefficient, and N is the filter order. An Nth-order FIR filter has (N+1) filter coefficients, which are commonly referred to as taps. While any number of taps could be used for equalizer 206, in one specific embodiment, a three-tap FIR may be used providing the following expression for b(k):

$$b(k) = F_0 a(k) + F_1 a(k-1) + F_2 a(k-2)$$

In one implementation, the estimator 208 is configured to provide a signal level estimate corresponding to the output of the equalizer 206 without high frequency amplitude modulation distortion. The estimator 208 is discussed in more detail below with respect to FIG. 3.

The boost unit 214 compares the expected signal level generated by the estimator 208 with the output of the equalizer 206. Noise or distortion events, for example, in the case of an optical media player, a fingerprint, smudge, or crosstalk from another layer on the media, may significantly reduce the signal level at the output of the equalizer 206. The slower changing output of the estimator 208 will diverge with the output of the equalizer 206 when such a distortion event occurs. The boost unit 214 may generate a compensation signal that is used to adjust the output of the equalizer 206, as discussed in more detail below with respect to FIG. 3.

An offset unit 212 may be used to adjust a DC level of the primary signal. The offset unit 212 provides a level-shifting output to the adder 216. The operation of the offset unit 212 and adder 216 are described in co-pending U.S. patent application Ser. No. 12/025,581, filed Feb. 4, 2008, which is hereby incorporated by reference for all purposes.

Figure 3:
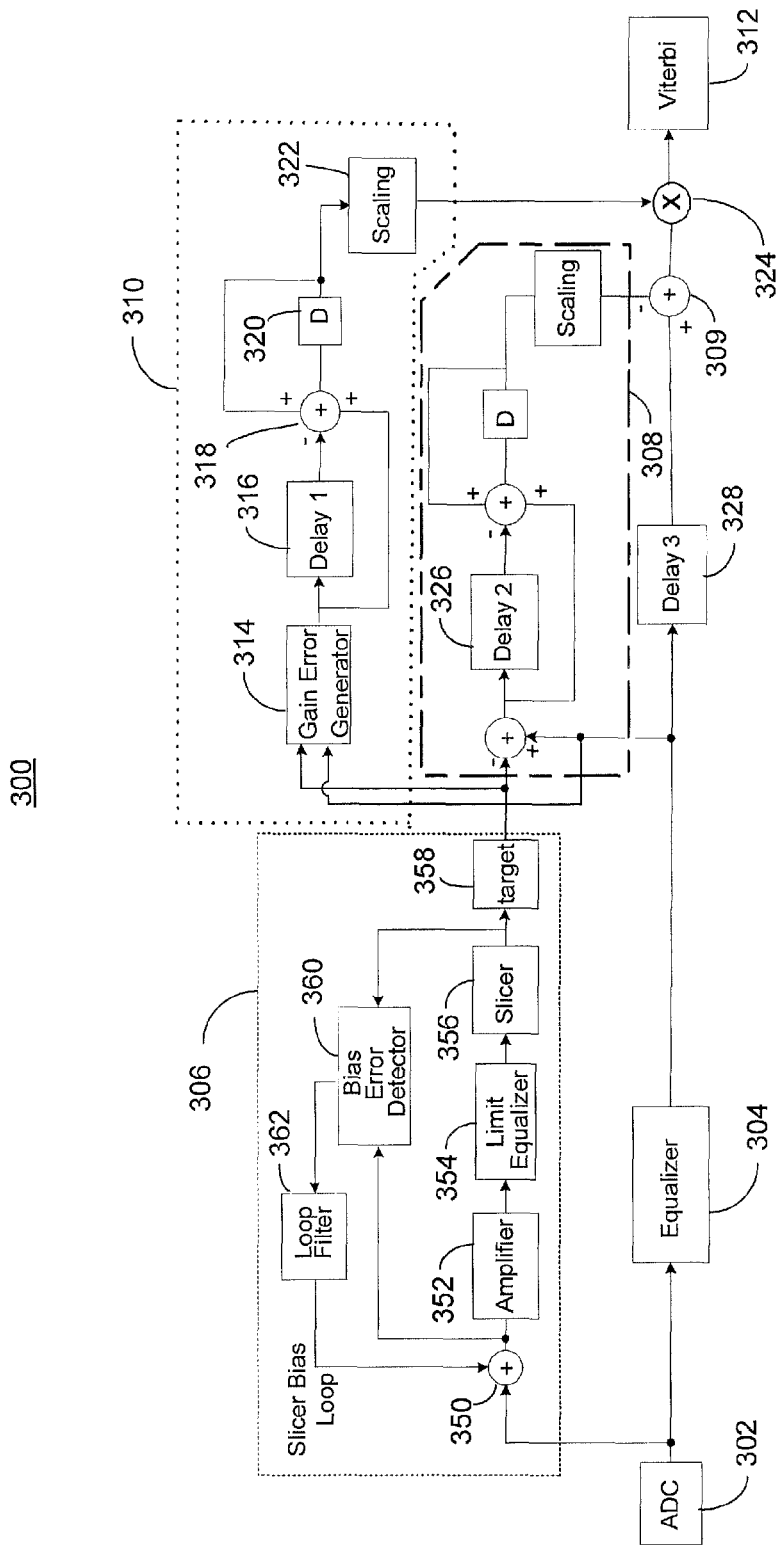
FIG. 3 is a block diagram of a portion of the signal processor of FIG. 2, showing additional detail.

FIG. 3 is a block diagram of a portion of the signal processor of FIG. 2, showing additional detail. An analog to digital converter (ADC) 302 provides a signal to both an equalizer 304 and an estimator 306. An offset unit 308 generates a level-shifting output that is supplied to a subtractor 309. The subtractor 309 applies the level shifting output to a delayed output of the equalizer 304. A boost unit 310 develops a proportional difference signal that is supplied to a multiplier 324. The boost unit 310 generates a compensating signal for applying to the delayed, level-shifted output of the equalizer 304 on an impulse-basis, rather than on a continuous basis (as would be with a conventional automatic gain control).

The estimator 306 includes an adder 350, an amplifier 352 that amplifies high frequency components of the output of the adder 350. The output of the amplifier 352 is provided to a limit equalizer 354 that may amplify its input in a non-linear manner and provides a signal to a slicer 356. The slicer 356 provides a two level output based on its input. For example, when the slicer input is greater than 0, its output is +1, if the slicer input is less than or equal to 0, its output is −1. The target 358 may be a partial response target filter that generates a reconstructed signal for comparison with the output of the equalizer 304 in the offset and boost units, 308 and 310 respectively. The target 358 may be implemented, for example, using fixed integer coefficients or adaptable real coefficients. When no distortion is present, the output of the target 358 should be equal to the output of the equalizer 304, at least approximately.

The bias error detector 360 generates an error signal using the outputs of the adder 350 and slicer 356. The error signal is provided to a bias loop filter 362 that helps compensate for direct current (DC) and low frequency offset distortion in the slicer path when added to the input signal at adder 350. The major blocks of the estimator 306 are discussed in more detail below with respect to FIGS. 6-10.

The boost unit 310 may include a gain error detector 314, a delay unit 316, an adder 318, a sample and hold unit 320, and a scaling unit 322.

In operation, the gain error detector 314 compares the equalizer output and the output of the estimator 306. Two example implementations of gain error detectors are discussed below with respect to FIGS. 4 and 5. Briefly, the equalizer and estimator outputs are divided in the gain error detector 314. When the two outputs are equal, e.g. no large scale distortion is present, the output of the gain error detector 314 is unity and the multiplication factor presented at the multiplier 324 is also unity. That is, no change is made to the signal at the multiplier 324.

Figure 1:
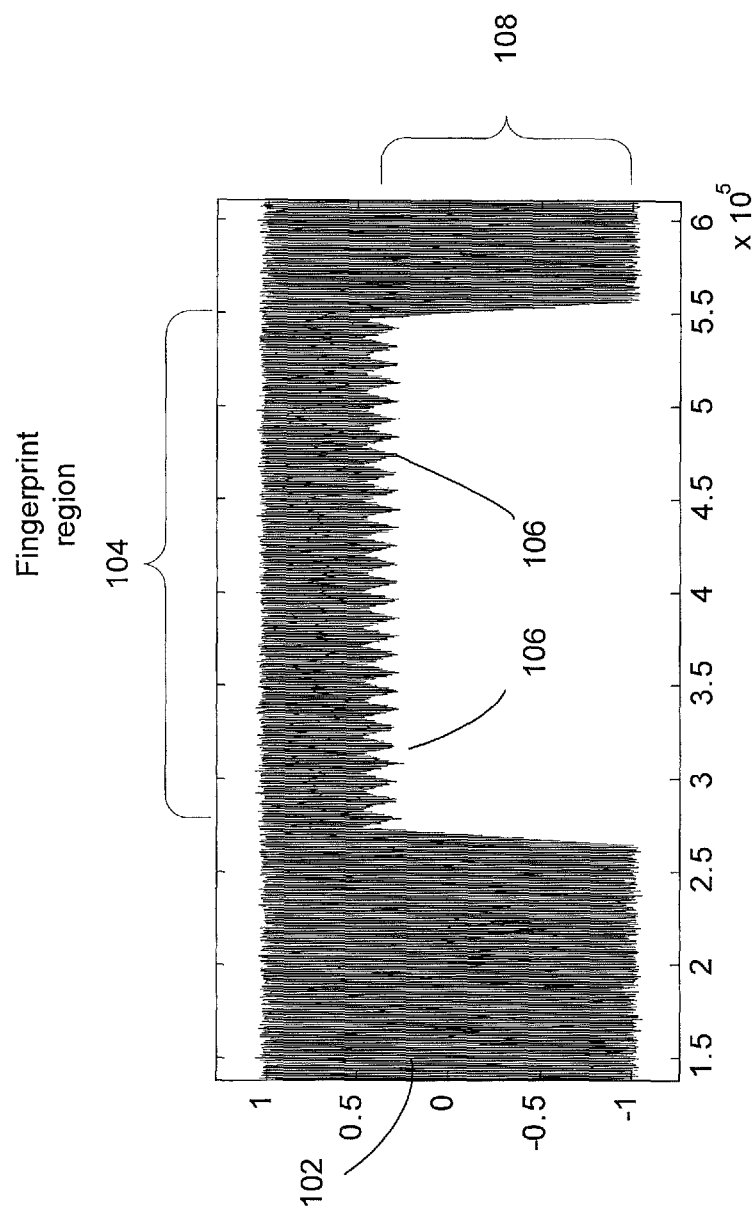
FIG. 1 illustrates a prior art media output signal exhibiting distortion.

When large scale distortion is present, for example, due to a fingerprint on a disk, the output of the equalizer 304, i.e. an actual signal, will appear like the signal in FIG. 1, with a relatively large decrease in output level. The slower changing output of the estimator 306 will maintain its original level over the period of the distortion, providing an expected signal level. When the expected signal is divided by the actual signal, the resulting gain error may be accumulated over a period of samples, set by the delay unit 316, the adder 318, and the sample and hold unit 320. The scaling unit 322 merely divides the accumulated sample by the number of samples accumulated, to provide an average gain error factor. For example, if the delay unit 316 accumulates values over 32 or 64 samples, the scaling unit will divide by 32 or 64, respectively.

In contrast to a typical AGC, the boost unit 310 does not adjust its output according to a reference voltage, but rather, the boost unit 310, in effect, generates a reference signal based on the signal that is to be boosted. This allows the use of a regular AGC, such as an AGC in an analog front end 202 of FIG. 2, to accommodate small changes in signal level, for example, due to media differences, while the boost unit 310 handles large signal level changes due to dirt, fingerprints, multilayer crosstalk, etc. The regular AGC can have a narrower bandwidth than might otherwise be required, and therefore enjoy a better noise characteristic, for example.

Delay unit 328 is utilized to match the timing of the equalizer 304 output signal with the delayed outputs of the offset unit 308 and the boost unit 310.

Figure 11:
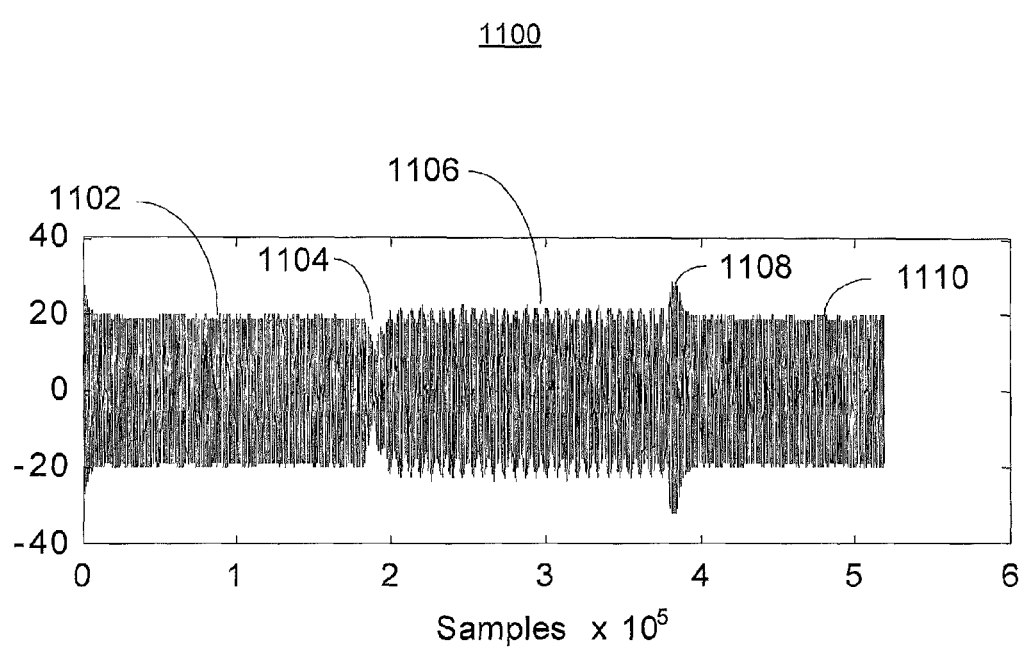
FIG. 11 is an exemplary signal after signal processing.

Referring briefly to FIG. 11, an example of the application of the boost unit 310 is illustrated. An output waveform 1100, for example, as measured at the input to the Viterbi unit 312 is shown. The signal in its normal state is illustrated at 1102. At 1104, distortion begins, such as due to a fingerprint as in FIG. 1. A slight dip at 1104 occurs as an average gain error is processed in the boost unit 310. That is, the multiplication factor output of the boost unit 310 may exhibit a brief lag while multiplication factor filtering occurs. Note that this dip 1104 is due to the lag in the averaging processing, not because of a mismatch with delay unit 328, for example. At the end of the distortion, at 1108, another slight bump is observed as the boost unit 210 again catches up with the current output of the equalizer 304. The nominal signal 1110 is observed after the distortion period.

At 1106, the distorted, but compensated signal, still exhibiting characteristic fingerprint ridges, is shown having a normal signal level.

Figure 4:
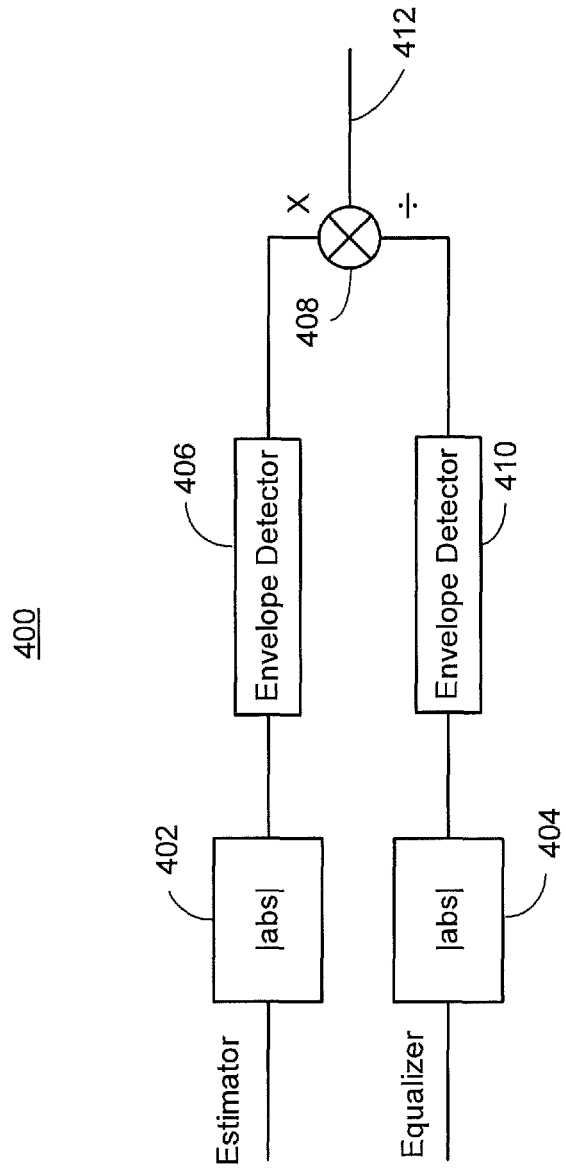
FIG. 4 is a block diagram of a gain error detector.

FIG. 4 illustrates one embodiment of a gain error detector 400, such as may be found in FIG. 3 as block 314. At block 402, the absolute value of the output of the estimator 306 may be determined. Similarly, block 404 may determine the absolute value of the output of the equalizer 304. Based on the disclosure and teachings provided herein, any of a variety of absolute value determination units may be utilized, including those known to those of ordinary skill in the art. Envelope detectors 406 and 410 may generate an envelope of each respective signal. For example, each envelope detector may be a low pass filter that essentially tracks the peak value of a signal, similar to an amplitude modulation (AM) demodulator.

The divider 408 may divide the output of the envelope detector 406 by the output of the envelope detector 410 to generate a gain error output 412. Because noise events reduce the signal level on the equalizer path, while the estimator path has a larger expected signal level, the output 412 will tend to be, a value greater than one.

Figure 5:
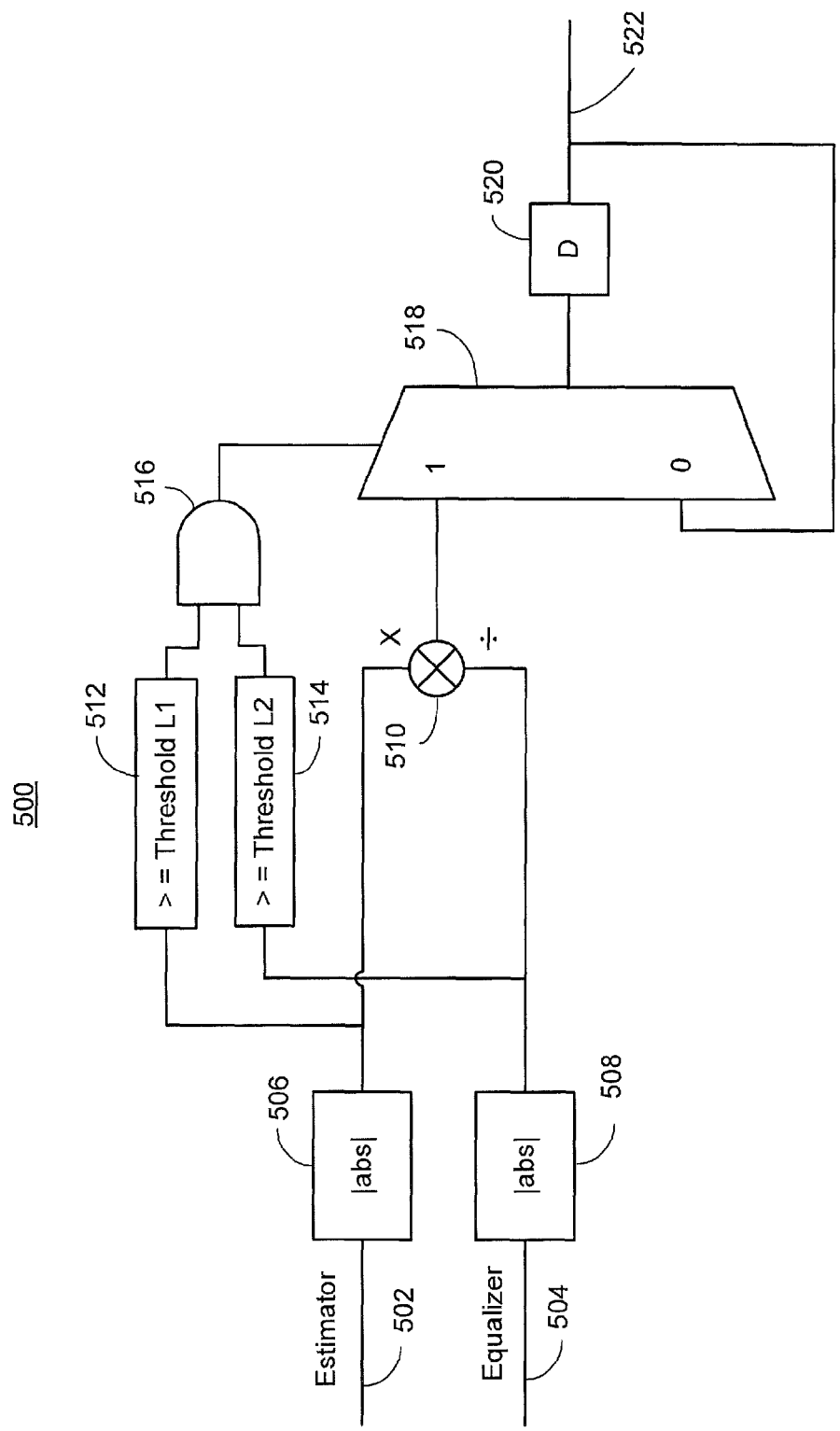
FIG. 5 is a block diagram of another embodiment of a gain error detector.

Several limit conditions, e.g. either equalizer or estimator values of zero or near zero, that could cause poor performance in the gain error detector 400 of FIG. 4 give rise to the error detector 500 of FIG. 5. As shown in FIG. 5, the error detector 500 has an input structure similar to that of FIG. 4, with the estimator input 502 and the equalizer input 504 processed to absolute values at blocks 506 and 508, respectively. The absolute values are then divided at the divider 510.

The estimator output from block 506 is compared to a first low value threshold at comparator 512. If the first low value threshold is met, the comparator 512 generates a logic "1." At comparator 514, the equalizer output of block 508 is compared to a second low value threshold and, if greater, than the second low value threshold, the comparator 514 generates a logic "1." The outputs of the comparators 512, 514 are coupled to inputs of AND gate 516. An output of the AND gate 516 is coupled to a control input of a multiplexer 518. An output of the divider 510 is coupled to a first data input of the multiplexer 518. An output of the multiplexer 518 is coupled to an input of a delay unit 520. An output of the delay unit 520 serves as an output 522 of the error detector 500. Additionally, the output of the delay unit 520 is fed back and coupled to a second data input of the multiplexer 518. The multiplexer 518 selects either the output of the divider 510 or feedback from the delay unit 520. The logic level of the signal at the output of the AND gate 516 determines whether the multiplexer 518 selects (i) the output of the divider 510, (ii) or feedback from the delay unit 520. For example, if both the comparators 512 and 514 generate a logic "1," AND gate 516 generates a logic "1," causing the multiplexer 518 to select the output of the divider 510. As another example, if at least one of the comparators 512 or 514 generates a logic "0," AND gate 516 generates a logic "0," causing the multiplexer 518 to select feedback from the delay unit 520.

The comparators 512 and 514 act as threshold detectors to help prevent the two undesirable conditions mentioned above with respect to FIG. 4 from occurring. In particular, the first undesirable condition is a value of the equalizer at or near zero, which would drive the value of the gain error detector output to an inordinately high value and potentially overload following stages. The second undesirable condition is an estimator output at or near zero, which would correspondingly cause the gain error detector output to approach zero and cut off the output of the multiplier 324. In some embodiments, the comparators 512 and 514 may be independently programmable or adjustable, allowing each respective threshold to be adjusted according to conditions. Thus, the first low value threshold may be configured to be a different value than the second low value threshold. Alternatively, the first and second low value thresholds may not be independently configurable.

FIGS. 6-10 illustrate in more detail the major components of the estimator 306.

Figure 6:
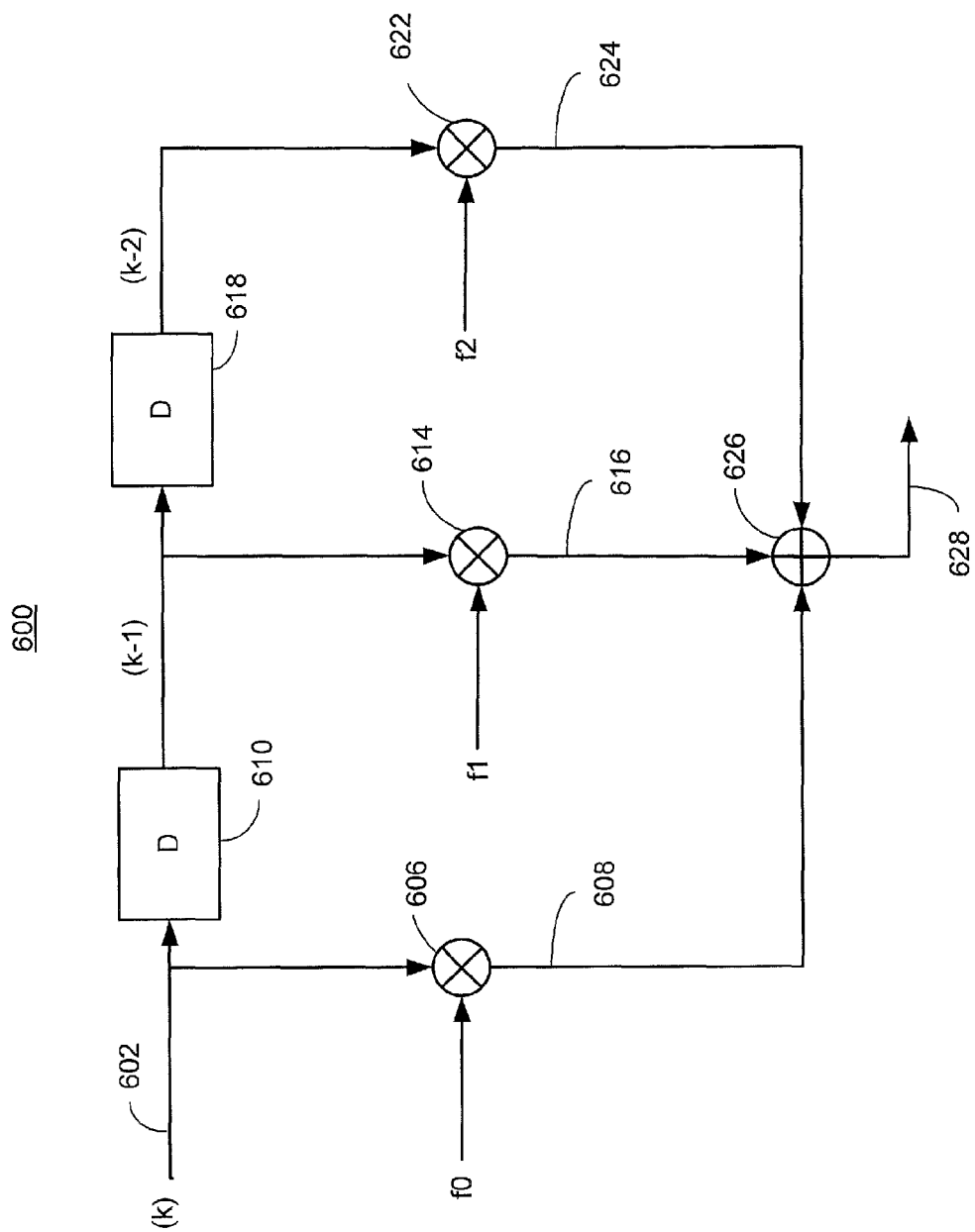
FIG. 6 is a block diagram of a digital booster.

FIG. 6 is a block diagram of an amplifier 600, such as amplifier 352 of FIG. 3. The amplifier 600 may be implemented as a multi-tap booster, with the number of taps equal to the number of taps of the equalizer 304 (which may be a 3-tap FIR, for example) of FIG. 3. As shown in FIG. 6, the multi-tap booster receives the output of the adder 350, designated (k), at input 602 and is provided to delay unit 610 to generate delayed signal (k−1). The delayed signal is provided to delay unit 618 to generate delayed signal (k−2).

The input (k) is mixed with carrier frequency f0 at mixer 606, signal (k−1) is mixed with carrier f1 at mixer 614, and signal (k−2) is mixed with carrier f2 at mixer 622. The respective mixed signals 608, 616, and 624 are combined at adder 626 and output at 628. The signal at output 628, d(k), is described by:

$$d(k)=(k)e^{j2\pi f_0 t}+(k-1)e^{j2\pi f_1 t}+(k-2)e^{j2\pi f_2 t}$$

where f0, f1, and f2 are carrier frequencies selected to boost the high frequency components of the signal at input 602. The carrier frequencies may be predetermined, or may be configurable or adjustable based on a desired output for d(k).

Figure 7:
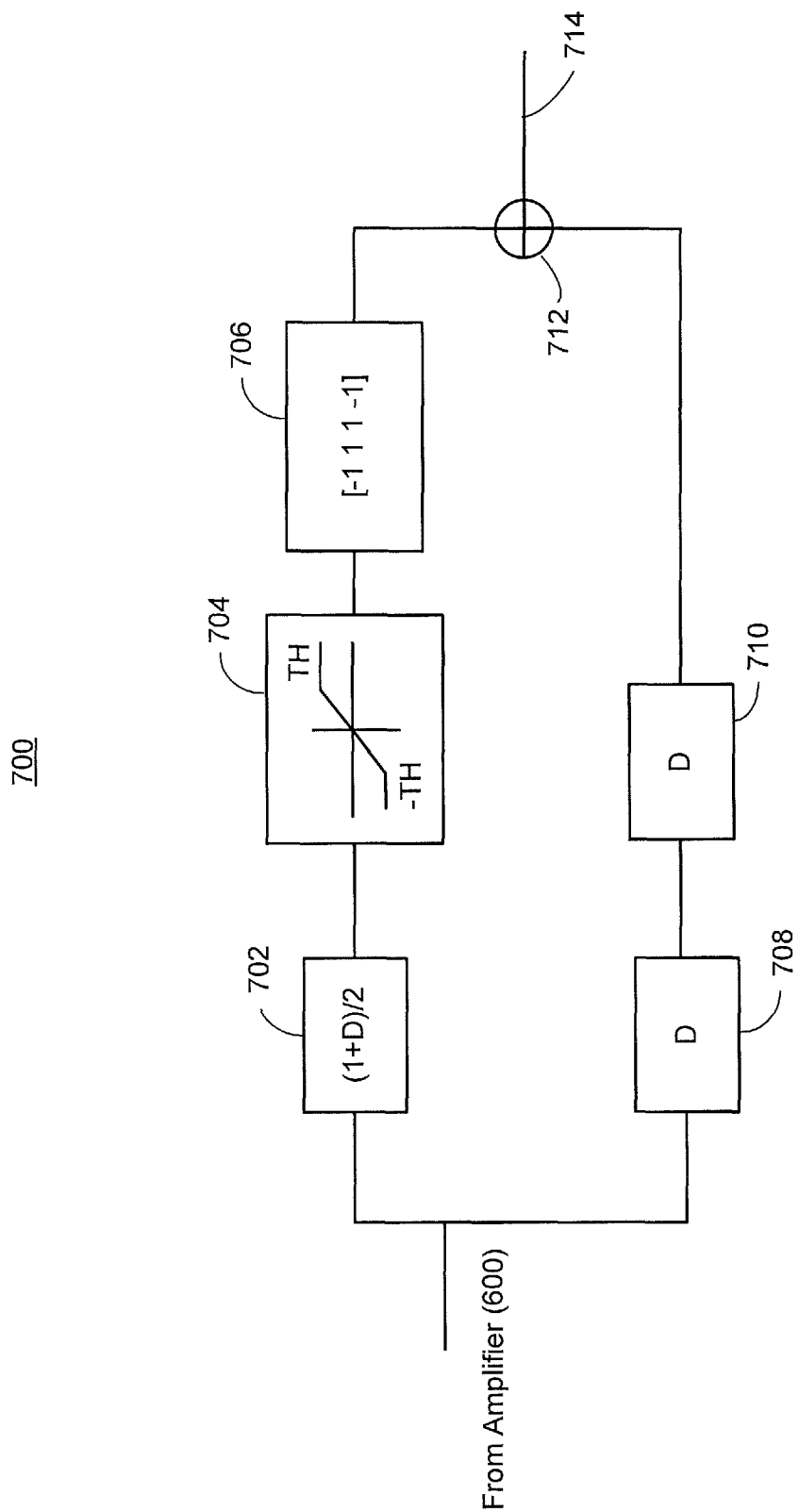
FIG. 7 is a block diagram of a limit equalizer.

FIG. 7 is a block diagram of an exemplary limit equalizer 700, such as limit equalizer 354 of FIG. 3. The limit equalizer 700 may receive as an input the output signal d(k) of an amplifier, such as the amplifier 600, described above. This input signal may be provided to a phase rotator 702. In one implementation, the phase rotator 702 adds a current sample d(k) and a previous sample d(k−1) and divides by two. In some embodiments, this procedure adjusts the phase back by 90°. A threshold limiter 704 receives the output of the phase rotator 702 and limits the phase rotator output to within a threshold set. The output of the threshold limiter 704 is provided to booster 706. The booster 706 may be a multi-tap booster similar to the amplifier 352 of FIG. 3, except that as shown in this exemplary embodiment the booster 706 is a four tap booster that utilizes a set of [−1 1 1 −1] taps. The output of booster 706 is provided to adder 712. The adder 712 adds the output of the booster 706 and a delayed signal to generate an output at 714. In one embodiment, the combined delays of blocks 708 and 710 substantially equal the delays imposed at blocks 702, 704, and 706.

Figure 8:
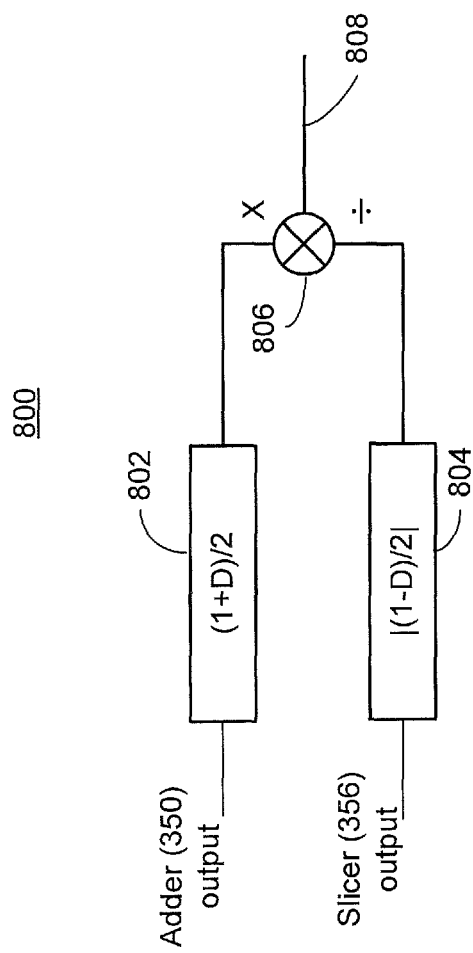
FIG. 8 is a block diagram of a bias error detector.

FIG. 8 is a block diagram of an exemplary bias error detector 800 that may be utilized for the bias error detector 360 of FIG. 3. In the illustrated embodiment, an output of the adder 350 of FIG. 3 is provided to a phase rotator 802. The phase rotator 802 may add a current value c(k) and a previous value c(k−1) and divide by two. This rotated signal is provided to a mixer 806. Correspondingly, an output of the slicer (356) is provided to a phase rotator 804. In this exemplary embodiment, the phase rotator 804 takes the absolute value of the slicer 306 output, e.g. g(k), subtracts a previous sample and divides by two, i.e., |(g(k)−g(k−1))/2|. This rotated signal is mixed with the other rotated signal at mixer 806 to generate a bias error signal for the loop filter, e.g. loop filter 362 of FIG. 3.

Figure 9:
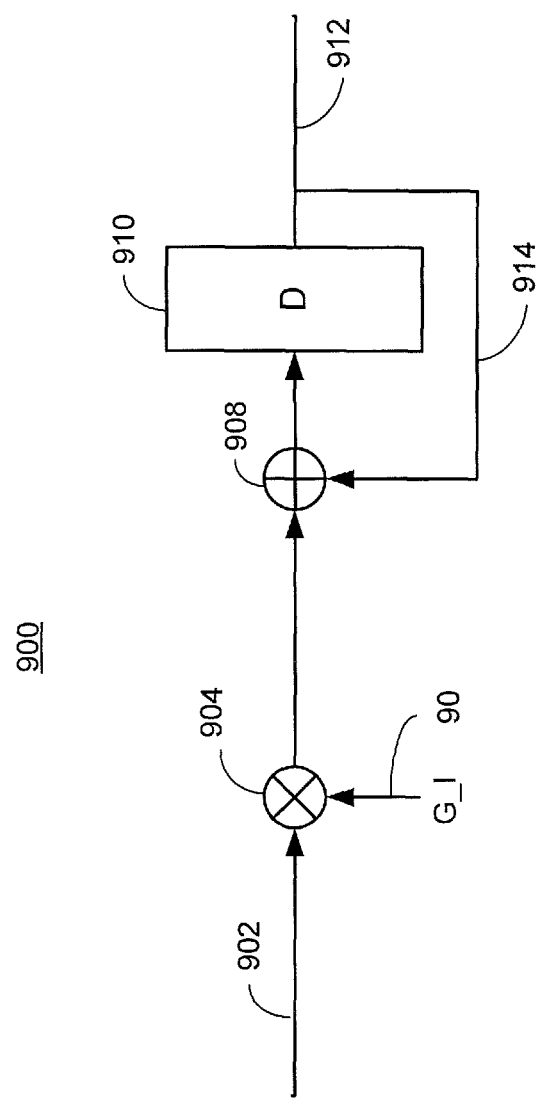
FIG. 9 is a block diagram of a digital loop filter in the form of an integrating slicer bias loop.

FIG. 9 is a block diagram of one of several appropriate filter embodiments for loop filter 362. As shown, an integrating filter 900 may receive the bias error signal, for example, the output of the bias error detector 800 described above, as input 902. The input 902 is mixed with an integrating loop gain, G_I, at mixer 904. The mixed signal is then provided to an accumulator comprising an adder 908 and a delay 910. Referring to FIG. 3, the output of the loop filter 900 (362) is subtracted from the input signal at adder 350 to remove low frequency offset distortion.

Figure 10:
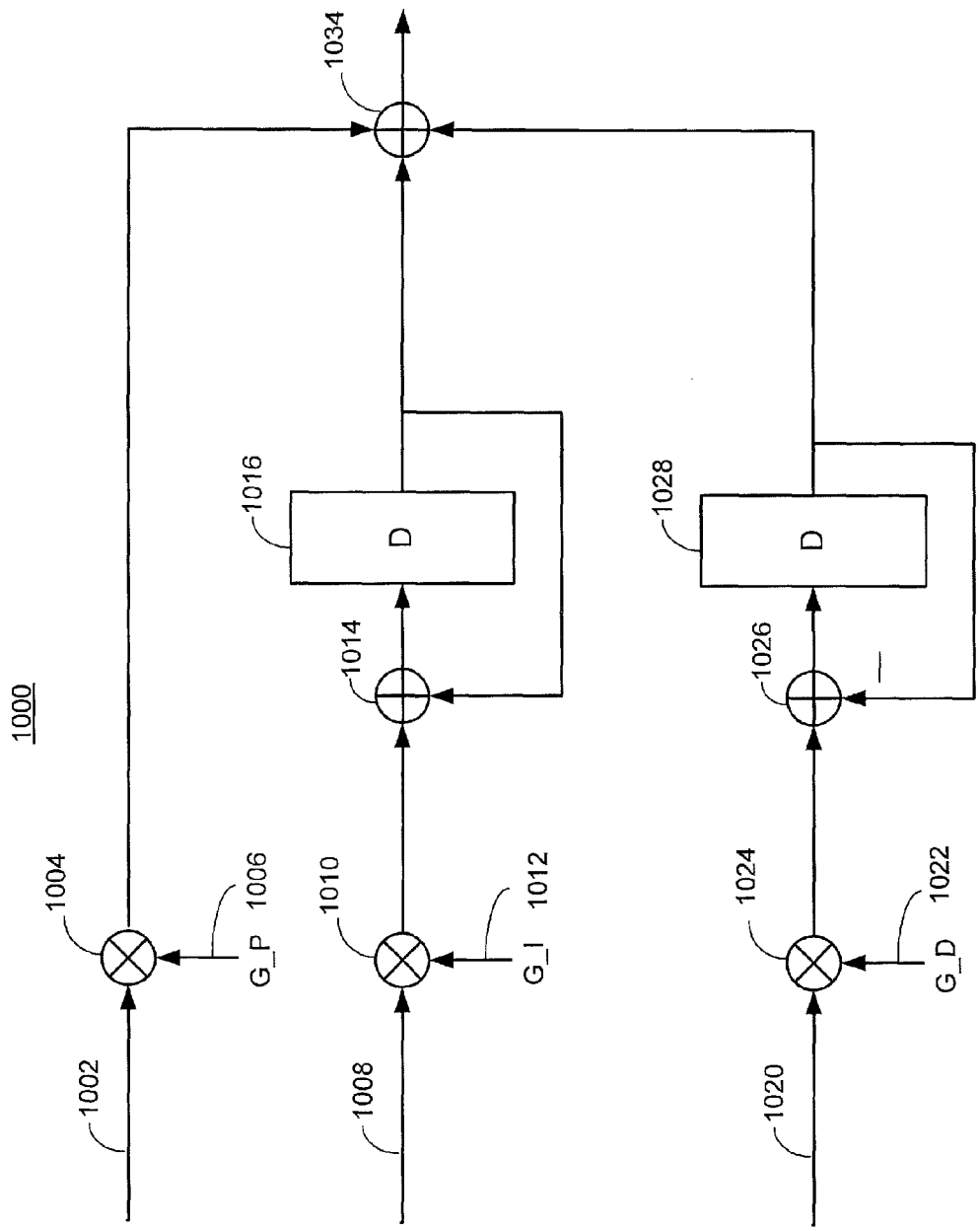
FIG. 10 is a block diagram of a proportional, integral, differential digital loop filter.

FIG. 10 is a block diagram of another embodiment of a loop filter in the form of a proportional integral differential (PID) filter 1000. In this embodiment, the PID filter 1000 attempts to correct the error between an input bias error signal (from the slicer 356, for example) and a desired setpoint. The PID filter includes three components: a proportional, an integral, and a derivative component. The proportional component corresponds to a proportional reaction to the bias error signal, e.g., j(k). To determine the proportional component, the bias error signal j(k) 1002 is mixed with a proportional loop gain G_P 1006 at mixer 1004. The mixer 1004 output is coupled to an adder 1034.

The integral component of the PID filter 1000 corresponds to a reaction based on a sum of recent bias error signals. To determine the integral component, the bias error signal j(k) at 1008 is mixed with an integral loop gain G_I 1012 at mixer 1010. The mixer 1010 output is coupled to an accumulator. The accumulator includes an adder 1014 and a delay 1016. An output of the delay 1016 is fed back to the adder 1014. The output of the delay 1016 is also coupled to the adder 1034. The integral component, when added to the proportional component, accelerates the movement of the process towards a set point.

The derivative component corresponds to a reaction to the rate at which the bias error signal j(k) has been changing. To determine the derivative component, the bias error signal j(k) 1020 is mixed with a differential loop gain G_D 1022 at mixer 1024. The mixer 1024 output is coupled to an accumulator. The accumulator includes an adder 1026 and a delay 1028 and generates a derivative component signal. The output of the delay 1028 is fed back to the adder 1026, which subtracts the output of the delay 1028 from the output of the mixer 1024. The output of the delay 1028 is also coupled to the adder 1034.

The derivative component slows the rate of change to reduce any overshoot generated by the integral component. Adder 1034 adds the proportional component, the integral component, and the derivative component to generate the loop filter output.

Figure 12:
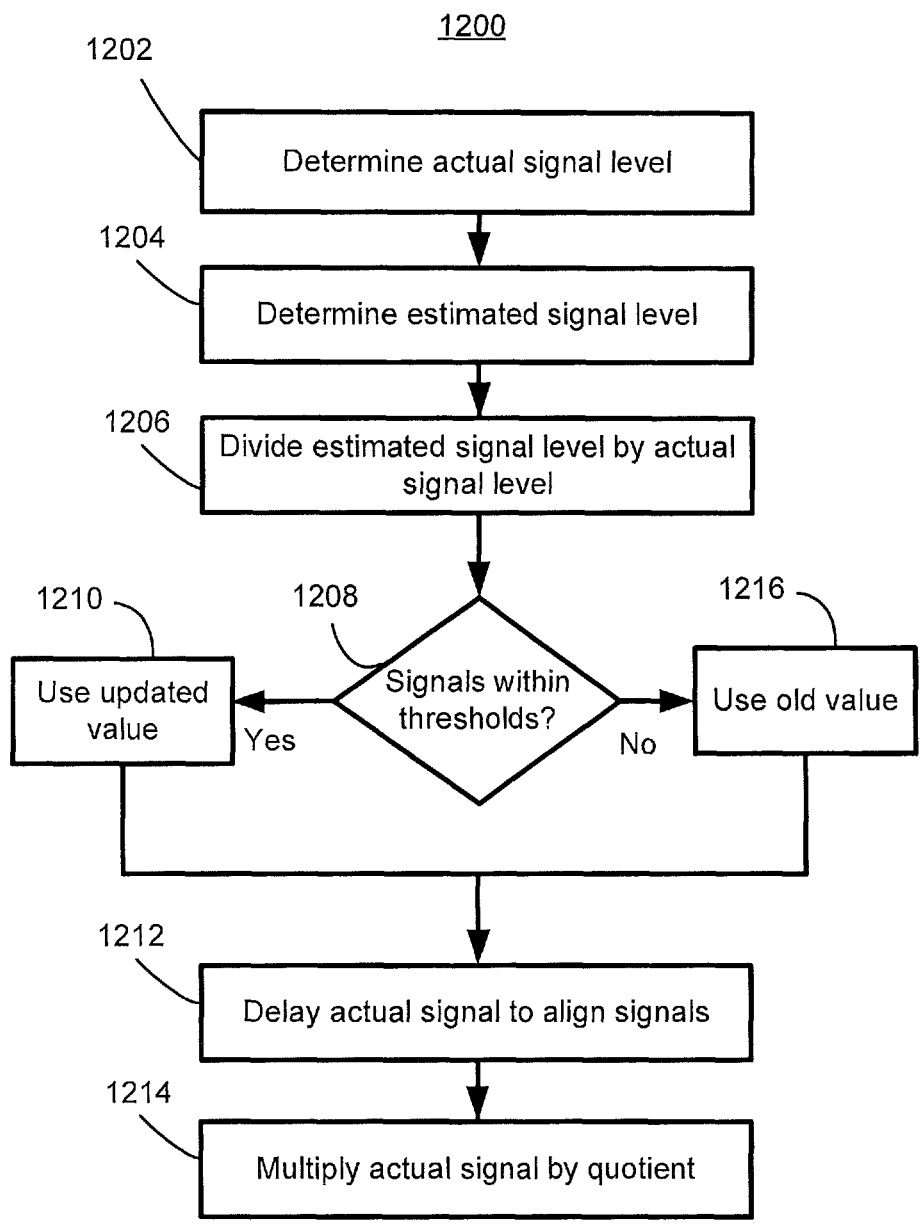
FIG. 12 is a flow chart of a method of detecting and correcting high frequency amplitude modulation distortion.

FIG. 12 is a flow chart of an example method 1200 of detecting and correcting high frequency amplitude modulation distortion. The method 1200 will be described with reference to FIG. 3 for ease of explanation. It is to be understood, however, that the method 1200 may be implemented by an apparatus other than the signal processor 300. At block 1202, an actual signal level may be determined. In FIG. 3, the output of the equalizer 304 may correspond to the actual signal. The actual signal level may be determined by measuring an envelop of the actual signal, for example.

At block 1204, an expected signal level may be determined. The expected signal level may be determined based on a moving average of an input signal. For example, the same input signal provided to the equalizer 304 may be provided to an estimator, such as an estimator 306.

At block 1206, a comparison of the actual signal level and the expected signal level may be determined. In one embodiment, the comparison may be determined based on the estimated signal level being divided by the actual signal level. For example, a first envelope signal corresponding to the actual signal level may divide a second envelope signal corresponding to the expected signal level. As described above with respect to FIG. 5, in some embodiments, the signals may be divided only when each signal is within a respective threshold signal level range. That is, if the numerator, the estimated signal is too small, the resulting calculation may be too small to be practically usable, so the estimated signal may first be compared to a threshold level prior to division. Similarly, if the denominator, the actual signal, is too small, the resulting calculation may be too large to be practically usable.

At block 1208, a comparison of each input signal may be made with its respective threshold. If each input signal is within its respective threshold, the 'yes' branch may be taken from block 1208 to block 1210. At block 1210, the result of the calculation made at block 1206 may be utilized as described below. The threshold values may be independently programmable or adjustable, to allow for variations in media, laser aging, etc.

At block 1212, the actual signal may be delayed to align the results of the calculation made at block 1206 for use in later operations.

At block 1214, the result of block 1206, that is a ratio of actual and estimated signal, may be applied to the actual signal, for example, using a multiplier. To illustrate, if the actual signal is reduced to a value of 0.66, and an estimated signal value remains at a nominal 1.0, the value applied at the multiplier will be 1.0/0.66=1.52. When the actual signal is multiplied by 1.52 at the multiplier 324, the level of the actual signal will be restored to near its expected value, e.g. 0.66× 1.52=1.0. This is unlike a typical AGC circuit, where a signal is adjusted to meet a target level supplied, usually, by a reference voltage or other nominal value. Because the threshold detector described above is able to manage relatively large, short-lived, level distortions, an AGC in the analog front end, for example, may be relatively narrow-band, to handle relatively small differences in media or level-to-level changes on a multi-layer disk. Because the AGC may be narrow-band, its noise characteristics may be optimized for the relatively narrow range required.

Returning to block 1208, if either signal is outside its threshold range, for example, too small, the 'no' branch from block 1208 may be taken to block 1216.

At block 1216, a previously stored result of the calculation at block 1206 may be used. The signal level distortion compensation techniques may be utilized in a variety of contexts in which it is not possible or desired to compensate for certain distortions using an AGC. For example, such techniques may be utilized in storage devices, such as storage devices using optical media. Such storage devices may be standalone peripherals, or may be integrated with a large variety of devices. FIGS. 13A-13D illustrate merely some example devices that may incorporate the signal level distortion compensation techniques described above.

Figure 13A:
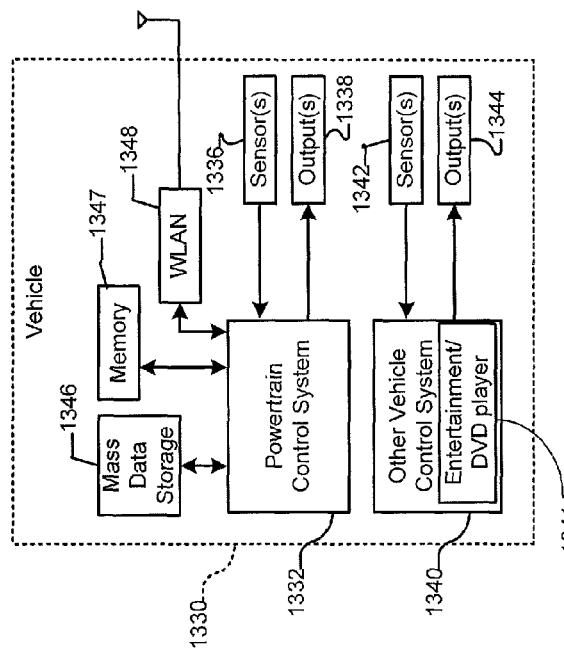
FIGS. 13A-13D illustrate exemplary embodiments of circuits in which a detector for high frequency distortion may be applied.

Referring now to FIG. 13A, such techniques may be utilized in a vehicle 1330. The vehicle 1330 includes a control system that may include mass data storage 1346, as well as a WLAN interface 1348. The mass data storage 1346 may support a powertrain control system 1332 that receives inputs from one or more sensors 1336 such as temperature sensors, pressure sensors, rotational sensors, airflow sensors and/or any other suitable sensors and/or that generates one or more output control signals 1338 such as engine operating parameters, transmission operating parameters, and/or other control signals. The mass data storage 1346 may include a detector for high amplitude modulation distortion.

Control system 1340 may likewise receive signals from input sensors 1342 and/or output control signals to one or more output devices 1344. In some implementations, control system 1340 may be part of an anti-lock braking system (ABS), a navigation system, a telematics system, a vehicle telematics system, a lane departure system, an adaptive cruise control system, and the like. The control system 1340 may include an entertainment system including a DVD player 1341 or other optical media player. Such an optical media player may include a detector for high amplitude modulation distortion.

Powertrain control system 1332 may communicate with mass data storage 1327 that stores data in a nonvolatile manner such as optical and/or magnetic storage devices. The mass storage device 1346 may be hard disk drive. Powertrain control system 1332 may be connected to memory 1347 such as RAM, ROM, low latency nonvolatile memory such as flash memory and/or other suitable electronic data storage. Powertrain control system 1332 also may support connections with a WLAN via a WLAN network interface 1348. The control system 1340 may also include mass data storage, memory and/or a WLAN interface (all not shown).

Figure 13B:
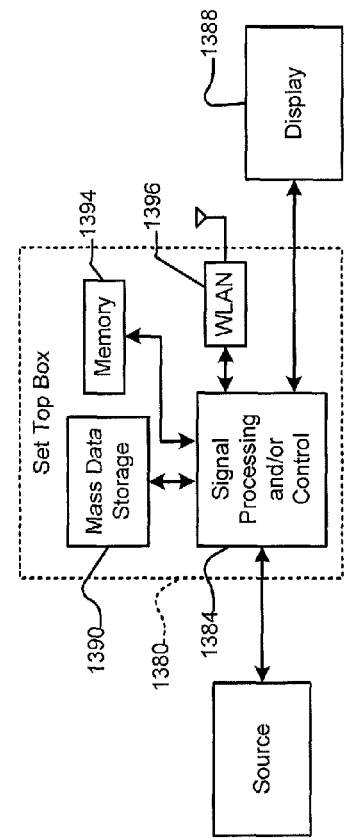

Referring now to FIG. 13B, such techniques may be utilized in a set top box 1380. The set top box 1380 may include either or both signal processing and/or control circuits, which are generally identified in FIG. 13B at 1384, a WLAN interface and/or mass data storage 1390 of the set top box 1380. Set top box 1380 receives signals from a source such as a broadband source and outputs standard and/or high definition audio/video signals suitable for a display 1388 such as a television and/or monitor and/or other video and/or audio output devices. Signal processing and/or control circuits 1384 and/or other circuits (not shown) of the set top box 1380 may process data, perform coding and/or encryption, perform calculations, format data and/or perform any other set top box function.

Set top box 1380 may communicate with mass data storage 1390 that stores data in a nonvolatile manner. Mass data storage 1390 may include optical and/or magnetic storage devices. For example, the mass storage 1390 may be a CD, DVD, or Blu-Ray player that may incorporate a detector for high amplitude modulation distortion. Set top box 1380 may be connected to memory 1394 such as RAM, ROM, low latency nonvolatile memory such as flash memory and/or other suitable electronic data storage. Set top box 1380 also may support connections with a WLAN via a WLAN network interface 1396.

Figure 13C:
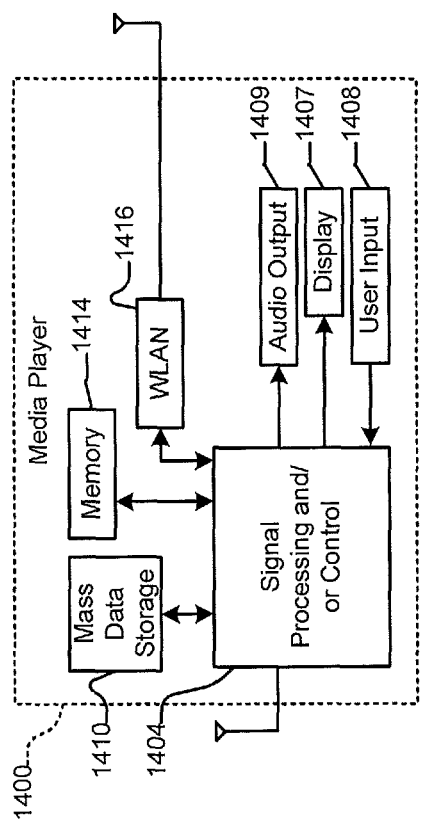

Referring now to FIG. 13C, such techniques may be used in a media player 1400. The media player 1400 may include either or both signal processing and/or control circuits, which are generally identified in FIG. 13C at 1404, a WLAN interface and/or mass data storage 1410 of the media player 1400. In some implementations, media player 1400 includes a display 1407 and/or a user input 1408 such as a keypad, touchpad and the like. In some implementations, media player 1400 may employ a graphical user interface (GUI) that typically employs menus, drop down menus, icons and/or a point-and-click interface via display 1407 and/or user input 1408. Media player 1400 further includes an audio output 1409 such as a speaker and/or audio output jack. Signal processing and/or control circuits 1404 and/or other circuits (not shown) of media player 1400 may process data, perform coding and/or encryption, perform calculations, format data and/or perform any other media player function.

Media player 1400 may communicate with mass data storage 1410 that stores data such as compressed audio and/or video content in a nonvolatile manner. In some implementations, the compressed audio files include files that are compliant with MP3 format or other suitable compressed audio and/or video formats. The mass data storage 1410 may include optical and/or magnetic storage devices. For example, the mass data storage may include a CD, DVD, or Blu-Ray player and may incorporate high frequency amplitude modulation distortion circuitry, as described above. Media player 1400 may be connected to memory 1414 such as RAM, ROM, low latency nonvolatile memory such as flash memory and/or other suitable electronic data storage. Media player 1400 also may support connections with a WLAN via a WLAN network interface 1416.

Figure 13D:
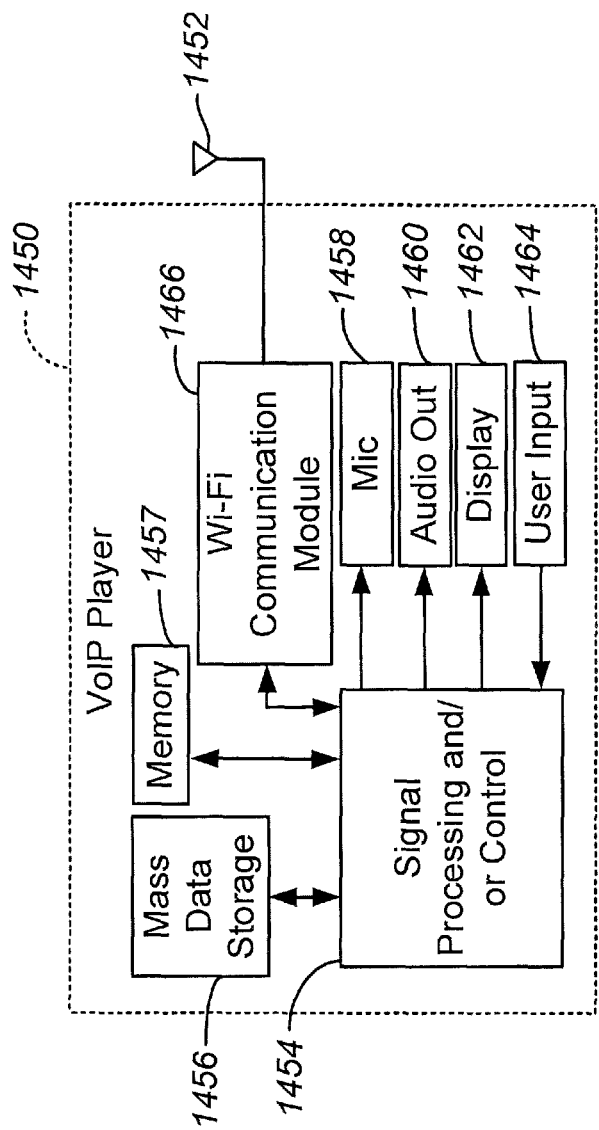

Referring to FIG. 13D, such techniques may be utilized in a Voice over Internet Protocol (VoIP) phone 1450 that may include an antenna 1452. The VoIP phone 1450 may include either or both signal processing and/or control circuits, which are generally identified in FIG. 13D at 1454, a wireless interface and/or mass data storage of the VoIP phone 1450. In some implementations, VoIP phone 1450 includes, in part, a microphone 1458, an audio output 1460 such as a speaker and/or audio output jack, a display monitor 1462, an input device 1464 such as a keypad, pointing device, voice actuation and/or other input devices, and a Wireless Fidelity (WiFi) communication module 1466. Signal processing and/or control circuits 1454 and/or other circuits (not shown) in VoIP phone 1450 may process data, perform coding and/or encryption, perform calculations, format data and/or perform other VoIP phone functions.

VoIP phone 1450 may communicate with mass data storage 1456 that stores data in a nonvolatile manner such as optical and/or magnetic storage devices, for example hard disk drives HDD and/or DVDs. The mass data storage 1456 may include optical and/or magnetic storage devices. For example, the mass data storage may include a CD, DVD, or Blu-Ray player and may incorporate high frequency amplitude modulation distortion circuitry, as described above. VoIP phone 1450 may be connected to memory 1457, which may be a RAM, ROM, low latency nonvolatile memory such as flash memory and/or other suitable electronic data storage. VoIP phone 1450 is configured to establish communications link with a VoIP network (not shown) via WiFi communication module 1466. The signal processing and/or control circuits 1454 or the WiFi communication module 1466 may implement a trusted firmware update.

The various blocks, operations, and techniques described above may be implemented in hardware, firmware, software, or any combination of hardware, firmware, and/or software. When implemented in software, the software may be stored in any computer readable memory such as on a magnetic disk, an optical disk, or other storage medium, in a RAM or ROM or flash memory of a computer, processor, hard disk drive, optical disk drive, tape drive, etc. Likewise, the software may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software may be delivered to a user or a system via a communication channel such as a telephone line, a DSL line, a cable television line, a wireless communication channel, the Internet, etc. (which are viewed as being the same as or interchangeable with providing such software via a transportable storage medium). When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, it will be apparent to those of ordinary skill in the art that changes, additions or deletions in addition to those explicitly described above may be made to the disclosed embodiments without departing from the spirit and scope of the invention.

We claim:

1. A method in a signal processor, the method comprising:
   equalizing, with an equalizer of the signal processor, a signal corresponding to data read from a storage medium to generate an equalized signal;
   determining, in the signal processor, a signal level of the equalized signal;
   determining, in the signal processor, an expected signal level of the equalized signal;
   performing, in the signal processor, a comparison between the signal level of the equalized signal and the expected signal level;
   adjusting, in the signal processor and after the equalized signal is output from the equalizer, an amplitude of the equalized signal by an amount determined based on the comparison of the signal level of the equalized signal and the expected signal level; and
   decoding, in the signal processor, the equalized signal after adjusting the amplitude of the equalized signal.

2. The method of claim 1, wherein determining an expected signal level of the equalized signal includes determining an expected signal level of the equalized signal without high frequency distortion.

3. The method of claim 2, further comprising:
   before equalizing the signal corresponding to data read from the storage medium, processing an analog signal to generate the signal corresponding to data read from the storage medium, wherein processing the analog signal includes adjusting the analog signal using an automatic gain control (AGC) circuit.

4. The method of claim 3, wherein adjusting the analog signal using an AGC circuit includes adjusting the analog signal using an AGC circuit having a bandwidth too narrow to allow the AGC circuit to compensate for at least some of the high frequency distortion.

5. The method of claim 4, wherein processing the analog signal further includes, after adjusting the analog signal using the AGC circuit, sampling the adjusted analog signal to generate the signal corresponding to data read from the storage medium.

6. The method of claim 1, wherein equalizing a signal corresponding to data read from a storage medium includes equalizing a signal corresponding to data read from an optical storage medium.

7. The method of claim 1, wherein adjusting the amplitude of the equalized signal comprises:
   determining a gain based on the comparison; and
   multiplying the equalized signal by the gain.

8. The method of claim 1, wherein determining the expected signal level comprises:
   generating a moving average of the signal corresponding to data read from the storage medium.

9. The method of claim 1, wherein performing the comparison of the signal level of the equalized signal and the expected signal level comprises:
   performing a division operation involving (i) a first envelope signal corresponding to the signal level of the equalized signal, and (ii) a second envelope signal corresponding to the expected signal level of the equalized signal.

10. The method of claim 9, wherein performing the comparison of the signal
    level of the equalized signal and the expected signal level further comprises:
    using a result of the division operation when each of the first envelope signal and the second envelope signal meets a respective threshold.

11. The method of claim 10, further comprising:
using a prior comparison for adjusting the amplitude of the equalized signal when at least one of the first envelope signal and the second envelope signal does not meet the respective threshold.

12. The method of claim 11, wherein each respective threshold is independently adjustable.

13. An apparatus, comprising:
an equalizer configured to generate an equalized signal by equalizing a signal corresponding to data read from a storage medium;
a signal estimator configured to generate an estimated signal corresponding to the equalized signal;
a first signal level detector configured to detect a level of the equalized signal;
a second signal level detector configured to detect a level of the estimated signal;
a gain error detector configured to generate a comparison of the level of the equalized signal and the level of the estimated signal;
a multiplier, separate from the equalizer, configured to amplify the equalized signal by an amount determined based on the comparison; and
a decoder configured to decode the equalized signal after amplification by the multiplier;
wherein the equalizer, the signal estimator, the first signal level detector, the second signal level detector, the gain error detector, the multiplier, and the decoder are implemented using one or more integrated circuit devices.

14. The apparatus of claim 13, the signal estimator is configured to generate an estimated signal corresponding to the equalized signal without high frequency distortion.

15. The apparatus of claim 14, further comprising:
an analog front end device configured to process an analog signal to generate the signal corresponding to data read from the storage medium, wherein the analog front end device includes an automatic gain control (AGC) circuit configured to adjust the analog signal, and wherein the AGC circuit has a bandwidth too narrow to allow the AGC circuit to compensate for at least some of the high frequency distortion.

16. The apparatus of claim 15, wherein the analog front end device further includes an analog-to-digital converter (ADC) configured to sample the adjusted analog signal to generate the signal corresponding to data read from the storage medium.

17. The apparatus of claim 16, wherein the analog front end device further comprises:
an optical medium front end configured to generate the analog signal.

18. The apparatus of claim 13, wherein the gain error detector comprises (i) a first envelope detector coupled to a divider and (ii) a second envelope detector coupled to the divider, and wherein the apparatus further comprises:
a multiplexer configured to select an output of the gain error detector as (i) an output of the divider or (ii) a previous output;
a first threshold detector coupled to the first envelope detector;
a second threshold detector coupled to the second envelope detector; and
wherein
the multiplexer is configured to select the output of the gain error detector as the output of the divider when both the first envelope detector and the second envelope detector have output signals that meet respective thresholds, and
the multiplexer, the first threshold detector, and the second threshold detector are implemented using one or more integrated circuit devices.

19. The apparatus of claim 13, further comprising:
a memory device;
wherein
at least one of the equalizer, the signal estimator, the first signal level detector, the second signal level detector, the gain error detector, the multiplier, and the decoder are implemented using a processor device that executes machine readable instructions stored in the memory, and
the processor device is included on one or more integrated circuit devices.

20. An apparatus, comprising:
means for equalizing a signal corresponding to data read from a storage medium to generate an equalized signal;
means for generating an estimated signal corresponding to the equalized signal;
means for detecting a level of the equalized signal;
means for detecting a level of the estimated signal;
means for generating a comparison of the level of the equalized signal and the level of the estimated signal;
means, separate from the means for equalizing the signal, for amplifying the equalized signal by an amount determined based on the comparison; and
means for decoding the equalized signal after amplification by the means for amplifying.

21. The apparatus of claim 20, wherein the means for generating the estimated signal is for generating an estimated signal corresponding to the equalized signal without high frequency distortion, and wherein the apparatus further comprises:
an analog front end device configured to process an analog signal to generate the signal corresponding to data read from the storage medium, wherein the analog front end device includes
an optical medium front end device configured to generate the analog signal,
an automatic gain control (AGC) circuit configured to adjust the analog signal, wherein the AGC circuit has a bandwidth too narrow to allow the AGC circuit to compensate for at least some of the high frequency distortion, and
an analog-to-digital converter (ADC) device configured to sample the adjusted analog signal to generate the signal corresponding to data read from the storage medium.

* * * * *